United States Patent
Duggan (10) Patent No.: US 11,068,671 B2
(45) Date of Patent: Jul. 20, 2021

(54) INTEGRATION OF DISPARATE SYSTEMS THROUGH THE USE OF MULTI-UID RFID ENCODING DEVICE SYSTEM AND METHOD

(71) Applicant: Consortium P, Inc., Rochester, NH (US)

(72) Inventor: Robert J Duggan, Strafford, NH (US)

(73) Assignee: Consortium P, Inc., Rochester, NH (US)

( * ) Notice: Subject to any disclaimer, the term of this patent is extended or adjusted under 35 U.S.C. 154(b) by 0 days.

(21) Appl. No.: 16/438,728

(22) Filed: Jun. 12, 2019

(65) Prior Publication Data
US 2019/0377912 A1 Dec. 12, 2019

Related U.S. Application Data

(60) Provisional application No. 62/683,835, filed on Jun. 12, 2018.

(51) Int. Cl.
*G06K 7/10* (2006.01)
*H04L 9/32* (2006.01)

(52) U.S. Cl.
CPC ..... *G06K 7/10099* (2013.01); *G06K 7/10297* (2013.01); *G06K 7/10415* (2013.01); *H04L 9/3263* (2013.01)

(58) Field of Classification Search
CPC ........... G06K 7/10099; G06K 7/10297; G06K 7/10415; H04L 9/3263
See application file for complete search history.

(56) References Cited

U.S. PATENT DOCUMENTS

| | | |
|---|---|---|
| 6,330,971 B1 | 12/2001 | Mabry et al. |
| 2002/0163443 A1 | 11/2002 | Steward et al. |
| 2007/0108281 A1 | 5/2007 | Kumar et al. |
| 2007/0187266 A1 | 8/2007 | Porter et al. |
| 2008/0218354 A1* | 9/2008 | Lorentz ............... G06K 7/0008 340/572.7 |
| 2010/0060422 A1 | 3/2010 | Van Nest et al. |
| 2013/0303085 A1 | 11/2013 | Boucher et al. |
| 2014/0227972 A1* | 8/2014 | Swaminathan ...... H04B 5/0031 455/41.1 |
| 2017/0026088 A1 | 1/2017 | Cho et al. |

OTHER PUBLICATIONS

PCT Search Report and Written Opinion for Appl No. PCT/US19/36756 dated Aug. 1, 2019, 14 pages.
International Preliminary Report on Patentability for Appl. No. PCT/US19/36756, dated Jun. 24, 2020, 30 Pages.

* cited by examiner

*Primary Examiner* — Nabil H Syed
(74) *Attorney, Agent, or Firm* — Maine Cernota & Rardin (57) ABSTRACT

A device, system, and method for integration of disparate systems uses multi-UID RFID encoding whereby all systems have a place to store their unique identifier without having to have knowledge of the other systems' requirements while at the same time allowing each system to communicate with the other systems by utilizing the other systems' unique identifier. Modules comprise an NFC Reader 405; an NFC Reader Manager 410; an NFC Reader Read Thread 415; a Tag module 420; a Tag Message 425; and a Tag Update Process 430.

20 Claims, 9 Drawing Sheets

100

110 FITNESS CLUB

115 SPA FACILITY

105 ITEM/ PERSON/ PLACE (ENTITY)

120 VALET PARKING SYSTEM

125 GOLF COURSE CLUBHOUSE

ENVIRONMENT

FIG. 1

SYSTEM COMPONENTS

MODULES

NFC READER MANAGER 410

TAG UPDATE PROCESS 430

FIG. 9

INTEGRATION OF DISPARATE SYSTEMS THROUGH THE USE OF MULTI-UID RFID ENCODING DEVICE SYSTEM AND METHOD

RELATED APPLICATIONS

This application claims the benefit of U.S. Provisional Application No. 62/683,835, filed Jun. 12, 2018. This application is herein incorporated by reference in its entirety for all purposes.

FIELD OF THE INVENTION

The invention relates to linking an identifier device to access system devices, and more specifically, to the integration of disparate systems through the use of multi-UID RFiD encoding.

BACKGROUND OF THE INVENTION

Current systems using RFiD depend on making an association between an item/person/place (entity) and an RFiD tag using a Unique IDentifier (UID) encoded within the RFiD device. Certain types of UHF RFiD devices allow the reprogramming of the UID so that it can be made to conform/operate with systems where a unique identifier is already assigned to an entity such as a person being assigned a member number when they join an exclusive club. Other types of RFiD devices do not allow the changing of the UID which is where interoperation between systems can become complicated. In the case of devices that cannot be modified, either because the device does not permit modification, or in the case that they do not support the encoding format of the other system (one system using numbers while the other uses both letters and numbers or simple binary data, etc.). Each system is usually modified to keep track of each additional identifier used by the other systems. Every time a new system is added, the integration again involves some sort of update to accommodate the other systems.

Consider the member number mentioned previously: it would be used by the club's systems to keep track of things like the member's purchases, dues payments, address, phone number, etc. However, when an RFiD system is introduced utilizing a UID that cannot be changed, one system or both need to be modified to accommodate the new identifier scheme. This can be costly and time consuming, not to mention an inconvenience for the member.

What is needed is a device, system, and method for integration of disparate systems through the use of multi-UID RFID encoding whereby all systems have a place to store their unique identifier without having to have knowledge of the other systems' requirements while at the same time allowing each system to communicate with the other systems by utilizing the other systems' unique identifier.

SUMMARY OF THE INVENTION

An embodiment provides a method for integration of a plurality of disparate systems for communication with at least one tag through a use of multi-UID RFID encoding comprising providing at least one the RFiD tag device (205) associated with one of an item, a person, or a place; the tag communicating with the plurality of disparate systems, the plurality of systems comprising at least a first system (220) and a second system (235); the communication comprising executing a plurality of computing modules; wherein only an identifier mapping/translation is added to the RFiD device, and wherein each of the disparate systems stores its unique identifier without requiring knowledge of any other disparate system's requirements, while simultaneously allowing each the disparate system to communicate with other disparate systems by utilizing each other disparate systems' unique identifier. In embodiments, the computing modules comprise an NFC Reader Module (405); an NFC Reader Manager Module (410); an NFC Reader Read Thread Module (415); a Tag Message Module (425); and a Tag Update Process Module (430). In other embodiments, the NFC Reader Module (405) comprises executing XML Configuration (505); executing NFC Reader Read Thread (510); executing a Passive Tag Read (515); executing a Reader Connect Attempt (520); executing a Card Disable (525); executing an Antenna Tag Read (530); executing a Tag Read Stop (535); executing a Reader Disconnect (540); executing a Compare (545); executing an XML Configuration Information Read (550); converting ASCII To HEX (555); and obtaining Passive Antenna Coordinate And Sector Info (560). In subsequent embodiments, the NFC Reader Manager Module (410) comprises invoking a Passive Reader Dictionary (605); Reading Tag Data from Each Reader (610); Processing Tag Data (615); Creating a New Tag (620); and executing Shut down (625). For additional embodiments the NFC Reader Read Thread Module (415) comprises executing a Passive Tag Read Event (705); Reading Passive Tag ARGS (710); executing a Tag Reading Thread (715); executing a Read Loop Start (720); stopping Reading (725); executing a Passive Reader Thread Method (730); executing a Duty Cycle Sleep (735); and sending a Passive Tag Read Event (740). In another embodiment, the Tag Message Module (425) comprises processing Tag Id Message (805); processing Tag Type Message (810); processing Reader Message (815); Formatting (820); processing Tag Update Message (825); executing Location (830); processing Sector Id (835); processing Tag Update Message (840); and processing Tag Out Of Service Message (845). For a following embodiment the Tag Update Process Module (430) comprises executing NFC Reader Manager (905); adding Message to Queue (910); starting Process (915); running (920); and executing Shutdown (925). In subsequent embodiments the plurality of systems comprises one or more of a fitness club (110); a spa facility (115); a valet parking system (120); and a golf course facility (125). In additional embodiments reading of the tag comprises reading blocks of memory; locating an NDEF text message; and returning text of the NDEF text message; invoking, in the NFC Reader Manager Module, a PRT On NFC Tag Read event method which calls Process Tag Read Data, which turns the text into an NFC Tag Read Msg containing an ID as a HexString, text, and a reader object. In included embodiments an NFC Tag Read Msg containing an ID as a HexString, text, and a reader object, wherein the NFC Tag Read Msg is passed on to an NFC Tag Update Process which turns converts the NFC Tag Read Msg into an NFC Tag Update Message which is handled by an outgoing message handler. In yet further embodiments an NFC Tag Read Msg containing an ID as a HexString, text, and a reader object, wherein the NFC Tag Read Msg is passed on to an NFC Tag Update Process which turns converts the NFC Tag Read Msg into an NFC Tag Update Message which is handled by an outgoing message handler, wherein the outgoing message handler is defined for a write to at least one of a DB; an HTTP Post; or a TextToWindow. In related embodiments the communication comprises Near Field Communication (NFC). For further embodiments the encoding comprises an NFC Data Exchange Format (NDEF). In ensuing embodiments the encoding comprises an NFC Data Exchange Format (NDEF) containing predefined container types, wherein the data types comprise at least one of a URL, an email address, a phone number, a business card, and plain text.

Another embodiment provides a device for integration of a plurality of disparate systems for communication with at least one tag through a use of multi-UID RFiD encoding comprising an RFiD tag (205) comprising a tag antenna for wireless communications; at least one tag processor (210), and a tag memory (215); the RFiD tag (205) communicating with a plurality of the disparate systems, each the disparate system comprising a system antenna for wireless communications; at least one system processor; and a system memory; wherein only an identifier mapping/translation is added to the RFiD device, and wherein each of the disparate systems stores its unique identifier without requiring knowledge of any other disparate system's requirements, while simultaneously allowing each the disparate system to communicate with other disparate systems by utilizing each other disparate systems' unique identifier. For yet further embodiments, each of the RFiD tag (205) and each of the disparate systems comprises a Near Field Communication (NFC) module. For more embodiments, encoding comprises an NFC Data Exchange Format (NDEF). Continued embodiments include that the communicating comprises computing modules comprising an NFC Reader Module (405); an NFC Reader Manager Module (410); an NFC Reader Read Thread Module (415); a Tag Message Module (425); and a Tag Update Process Module (430). For additional embodiments, each of the RFiD tag (205) and each of the disparate systems comprises an encryption module comprising public and private keys.

A yet further embodiment provides a system for integration of a plurality of disparate systems for communication with at least one tag through a use of multi-UID RFiD encoding comprising at least one the RFiD tag device (205) associated with one of an item, a person, or a place; a plurality of disparate systems, the plurality of disparate systems comprising at least a first system (220) and a second system (235); the tag communicating with the plurality of disparate systems; the communication comprising executing a plurality of computing modules; the plurality of computing modules comprising an NFC Reader Module (405); an NFC Reader Manager Module (410); an NFC Reader Read Thread Module (415); a Tag Message Module (425); and a Tag Update Process Module (430). wherein only an identifier mapping/translation is added to the RFiD device, and wherein each of the disparate systems stores its unique identifier without requiring knowledge of any other disparate system's requirements, while simultaneously allowing each the disparate system to communicate with other disparate systems by utilizing each other disparate systems' unique identifier.

The features and advantages described herein are not all-inclusive and, in particular, many additional features and advantages will be apparent to one of ordinary skill in the art in view of the drawings, specification, and claims. It should be noted that the language used in the specification has been principally selected for readability and instructional purposes, and not to limit the scope of the inventive subject matter.

BRIEF DESCRIPTION OF THE DRAWINGS

Figures are not necessarily to scale and illustrations of relative sizes, shapes and other detailed attributes of elements may be schematic rather than literal or precise.

DETAILED DESCRIPTION

Figure 1:
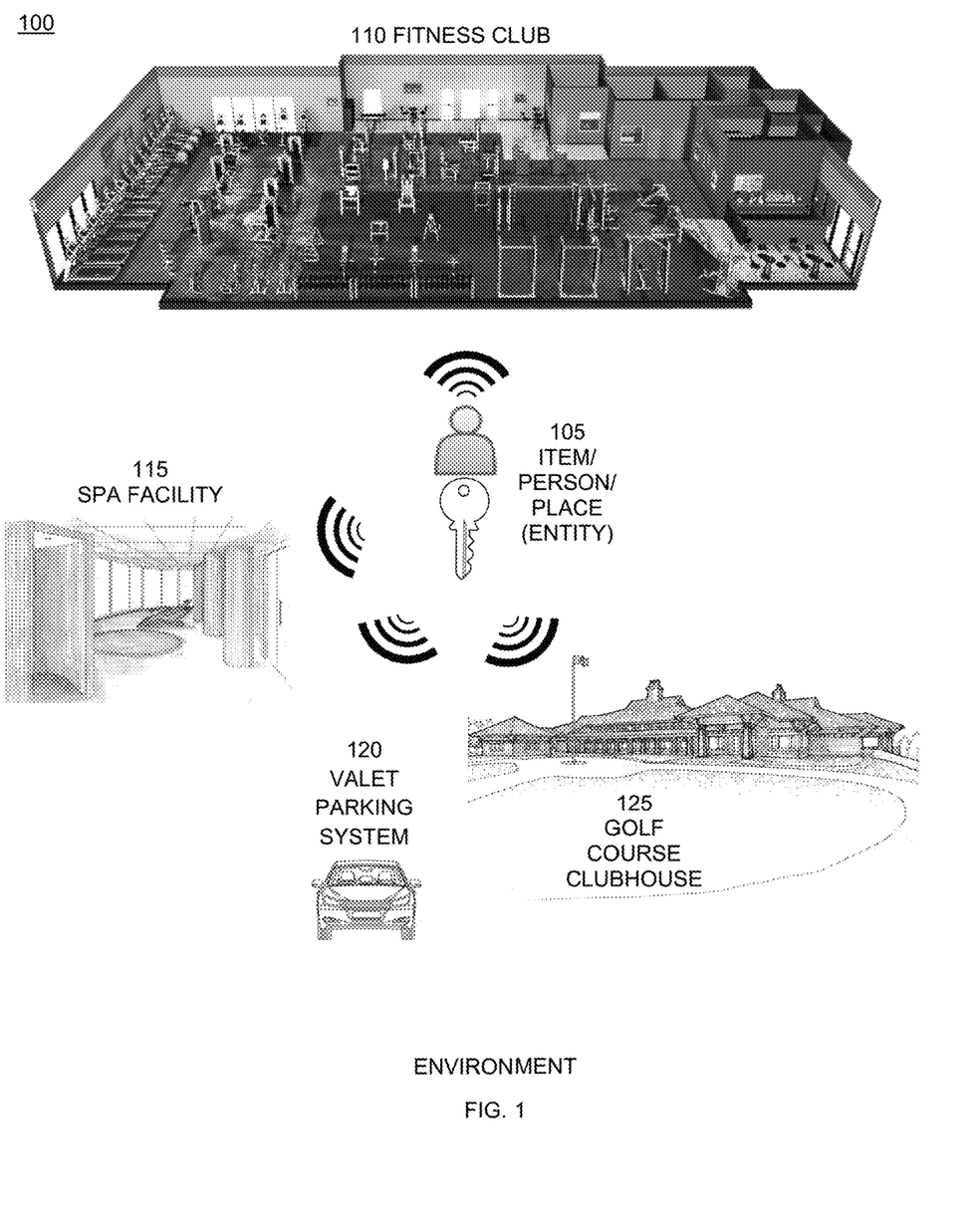
FIG. 1 is a simplified diagram of an environment for the integration of disparate systems through the use of multi-UID RFiD configured in accordance with an embodiment.

FIG. 1 depicts a simplified diagram 100 of an environment for the integration of disparate systems through the use of multi-UID RFiD. As presented above, in embodiments, the environment includes an item/person/place (entity) with an RFiD tag key for communications 105. User RFiD key 105 communicates with systems such as fitness club 110; spa facility 115; valet parking system 120; and golf course facility 125.

Figure 2:
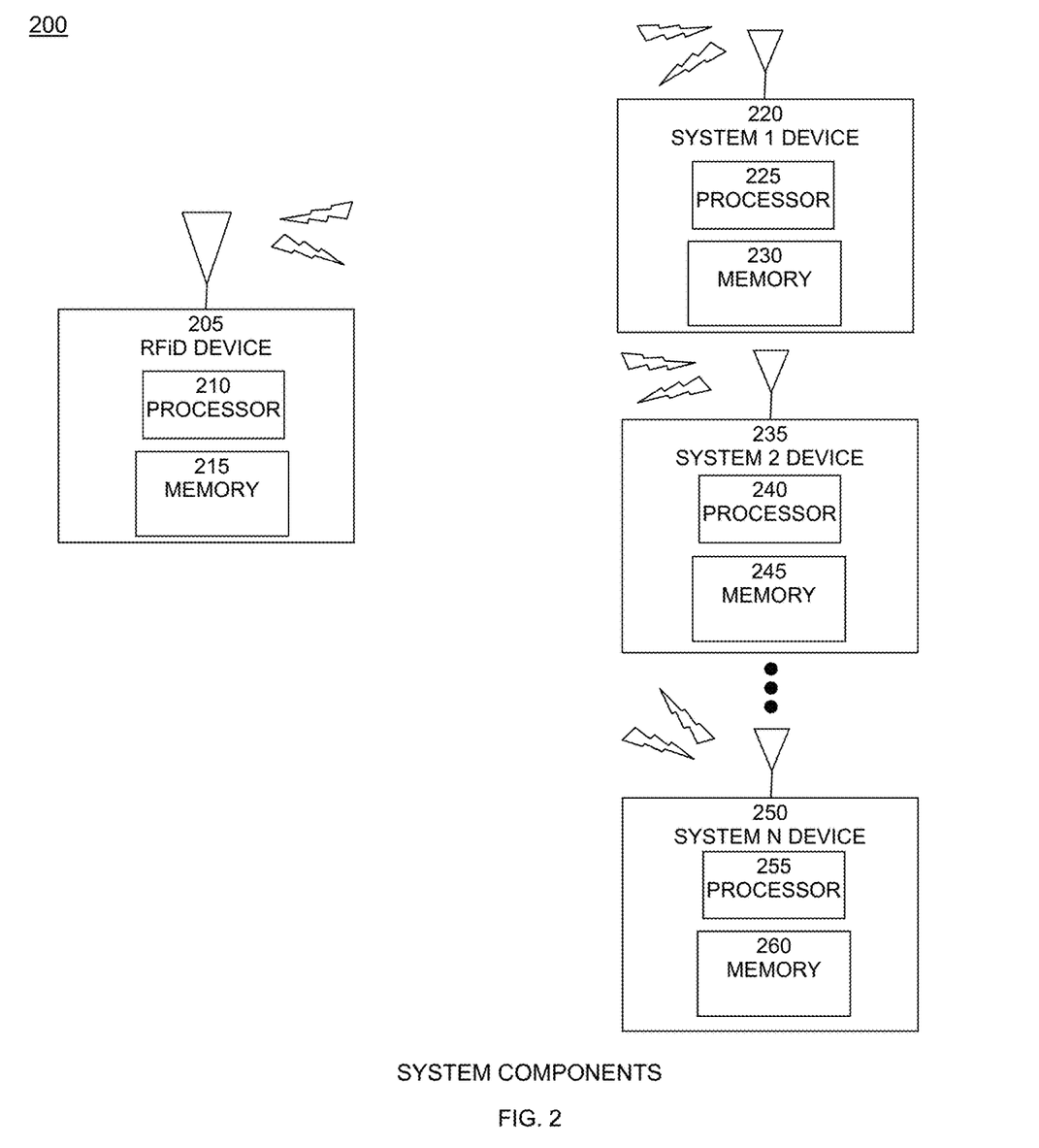
FIG. 2 is a simplified block diagram for the integration of disparate systems through the use of multi-UID RFiD in accordance with embodiments.

FIG. 2 depicts a simplified block diagram 200 for the integration of disparate systems through the use of multi-UID RFiD. RFiD device 205 can be associated with a Person A. In embodiments, RFiD device 205 can comprise one or more antennas for wireless communications, one or more processors 210, and memory 215. RFiD device 205 can interface with System 1 device 220 which comprises one or more processors 225, and memory 230; System 2 device 235 which comprises one or more processors 240, and memory 245, and System N device 250 which comprises one or more processors 255, and memory 260.

Embodiments utilize a Near Field Communications (NFC) Data Exchange format (NDEF) to encode additional unique identifiers. The NDEF format can be thought of as a type of file system where information is stored in the user memory of the RFiD device. The format contains predefined container types for data such as a URL, email address, phone number, business card, plain text, etc. In the case of adding additional unique identifiers, one of the existing types is utilized and further encoded such that all systems have a place to store their unique identifier without having to have knowledge of the other systems' requirements while at the same time allowing each system to communicate with the other systems by utilizing the other systems' unique identifier.

Figure 3:
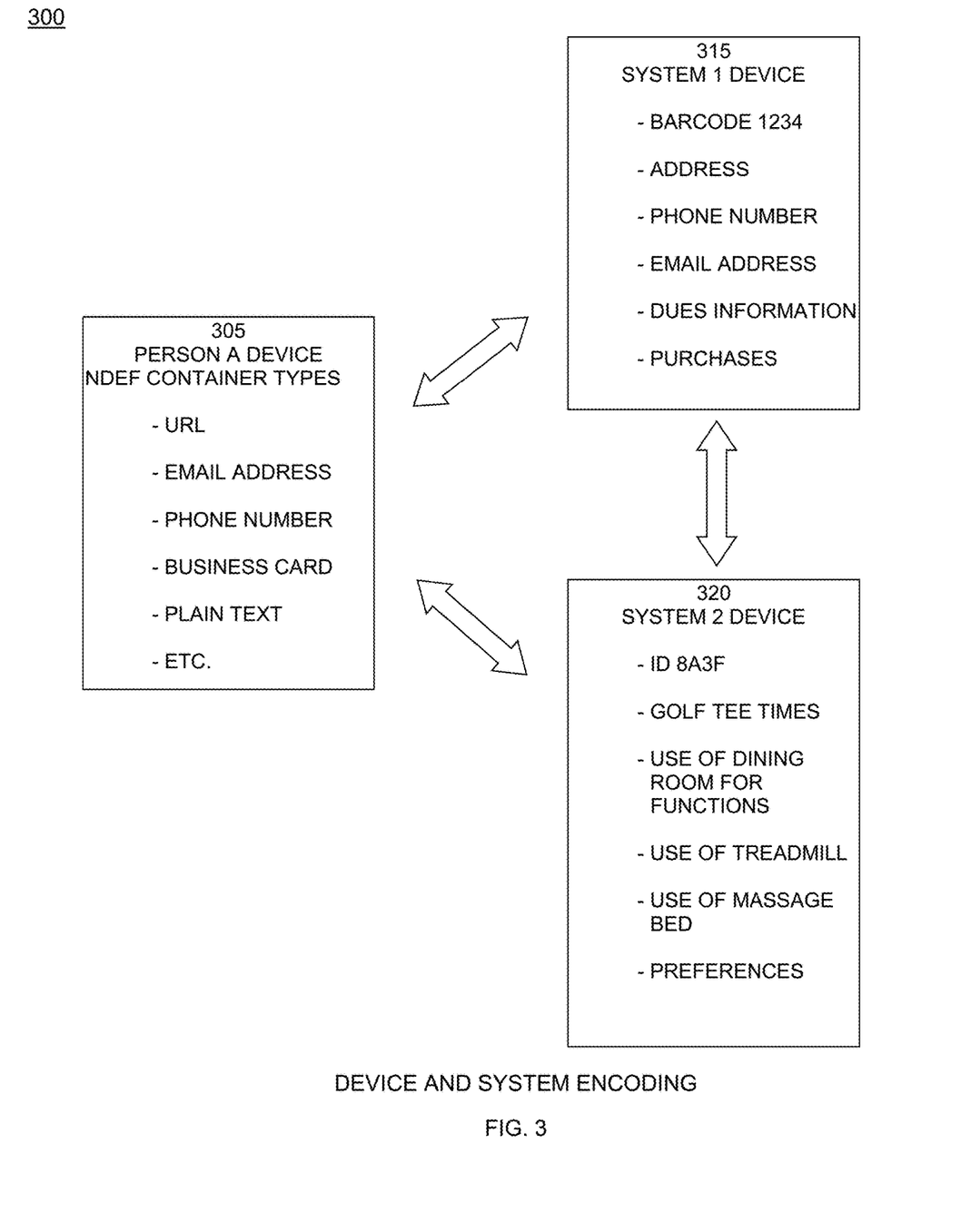
FIG. 3 is a block diagram of device component encoding for the integration of disparate systems through the use of multi-UID RFiD in accordance with one embodiment.

FIG. 3 depicts a block diagram 300 of device components for the integration of disparate systems through the use of multi-UID RFiD. As discussed above, encoding of Person A device comprises NDEF container types 305 such as URL; email address; phone number; business card; plain text; etc. Encoding of System 1 device 315 embodiment examples comprise: barcode 1234; address; phone number; email address; dues information; and purchases. Encoding of System 2 device 320 embodiment examples comprise: ID 8A3F; golf tee times; use of dining room for functions; use of treadmill; use of massage bed; and preferences.

Consider two systems, System 1 and System 2. In System 1, Person A who is assigned a membership card and is identified by a numeric barcode of 1234. In System 2 the same person is identified as an alphanumeric 8A3F. System 1 contains Person A's address, phone number, email, and dues information, purchases, etc. System 2 contains information that permits and keeps track of Person A's scheduled usage of club accommodations and amenities offered (golf tee times, use of dining room for functions, use of treadmill or massage bed, etc.) as well as their preferences for use (prefers tee time at 8 am on Saturday). Each system can perform their intended purpose independently until it is desired to utilize information from one system in the other. At some point the club may want the use of accommodations to be restricted based on a member's purchase amount for the month. In this case, System 2 must get information from System 1, but System 2 does not know how to identify the person in System 1. System 2 could be modified to have knowledge of not only how to find Person A's information internally but also how to find Person A in System 1. However, in this scenario, each additional system added would need to be modified to have knowledge about each of the other systems. By utilizing the RFiD device with a common identifier encoding format, the identification for Person A is contained within the device allowing each system to identify Person A in any of the other systems with only the modification to utilize the RFiD device information. In this way additional systems can be put in place without having to update all systems as each new one comes on line, only the identifier mapping/translation need be added to the RFiD device.

The below explains a simplified format for integration between two systems. A more complicated embodiment format would incorporate a form of encryption that may use public and private keys. In the case of using the text format, the encrypted data could then be further encoded into ASCII so that the standard text NDEF type could be used.

One of the tags of an embodiment has the (14 byte) memory content of Table 1, and NDEF as follows:

TABLE 1

TAG MEMORY CONTENT

| # | | Memory Content |
|---|---|---|
| [00] | * | 04:73:18 E7 (UID0-UID2, BCC0) |
| [01] | * | DA:9D:40:84 (UID3-UID6) |
| [02] | . | 83 48 00 00 (BCC1, INT, LOCK0-LOCK1) |
| [03] | . | E1:10:06:00 (OTP0-OTP3) |
| [04] | . | 03 12 D1 01 \|....\| |
| [05] | . | 0E 54 02 65 \|.T.e\| |
| [06] | . | 6E 31 30 30 \|n100\| |
| [07] | . | 33 33 35 39 \|3359\| |

TABLE 1-continued

TAG MEMORY CONTENT

| # | | Memory Content |
|---|---|---|
| [08] | . | 33 32 34 36 \|3246\| |
| [09] | . | FE 00 00 00 \|....\| |
| [0A] | . | 00 00 00 00 \|....\| |
| [0B] | . | 00 00 00 00 \|....\| |
| [0C] | . | 00 00 00 00 \|....\| |
| [0D] | . | 00 00 00 00 \|....\| |
| [0E] | . | 00 00 00 00 \|....\| |
| [0F] | . | 00 00 00 00 \|....\| |
| [10] | | 00 00 00 FF (AUTH0) |
| [11] | | 00 05 -- -- (ACCESS, VCTID) |
| [12] | | +P FF FF FF FF (PWD0-PWD3) |
| [13] | | +P 00 00 -- -- (PACK0-PACK1) |

NDEF as follows:
Record #1: Text record:
Type Name Format: NFC Forum well-known type
Short Record
type: "T"
encoding: UTF-8
lang: "en"
text: "10033593246"
Payload length: 14 bytes
Payload data:

```
[00] 02 65 6E 31 30 30 33 33 35 39 33 32 34 36
|.en10033593246 |
# NDEF message:
[00] D1 01 0E 54 02 65 6E 31 30 30 33 33 35 39 33 32
|...T.en100335932|
[10] 34 36                                    |46      |
# NDEF Capability Container (CC):
Mapping version: 1.0
Maximum NDEF data size: 48 bytes
NDEF access: Read & Write
E1 10 06 00                                  |....    |
```

Figure 4:
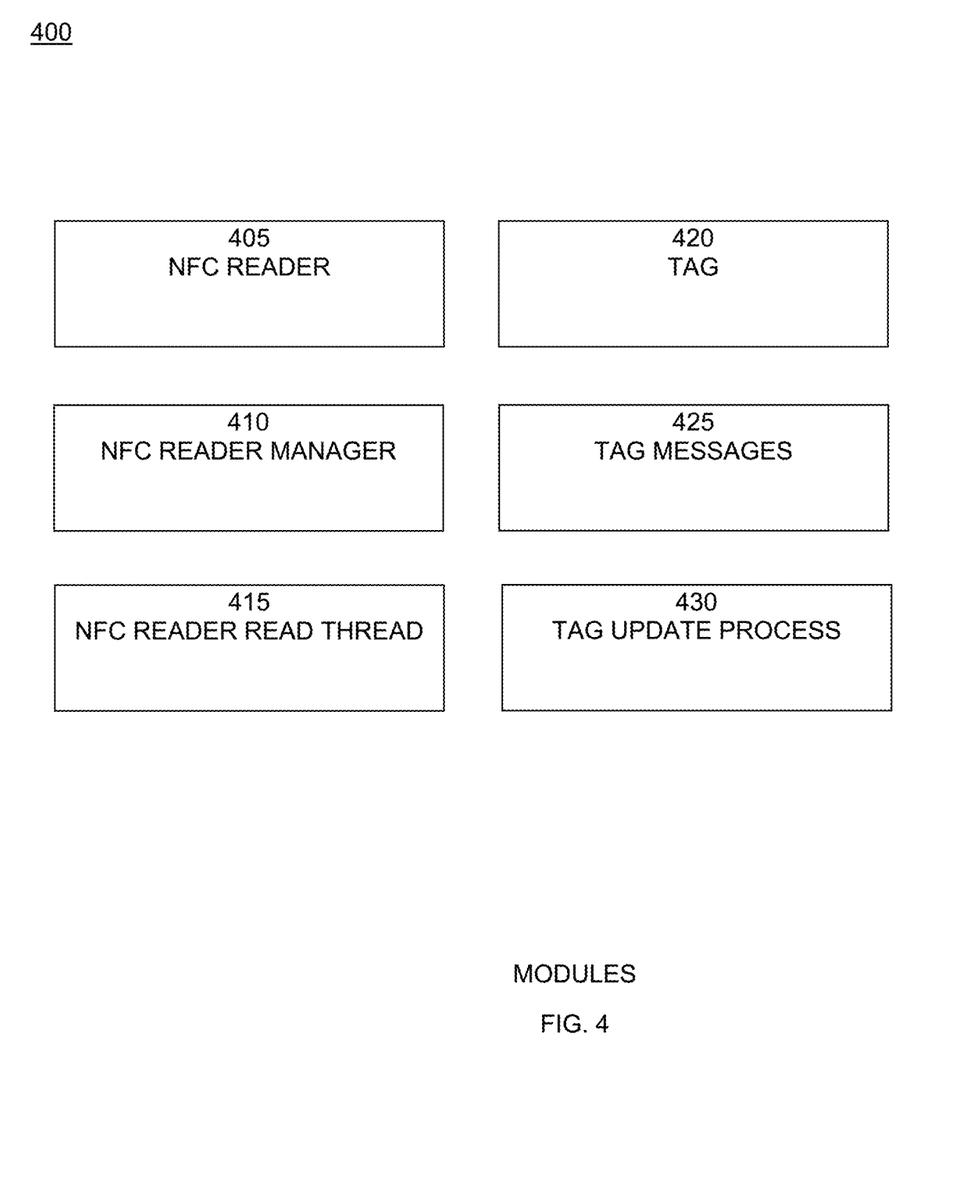
FIG. 4 depicts high level modules of a method for the integration of disparate systems through the use of multi-UID RFiD operation in accordance with one embodiment.

FIG. 4 depicts high level modules 400 of a method for the integration of disparate systems through the use of multi-UID RFiD operation. Modules comprise: NFC Reader 405; NFC Reader Manager 410; NFC Reader Read Thread 415; Tag 420; Tag Message 425; and Tag Update Process 430. Embodiments of the modules are included in the Appendix. For embodiments, NFCReader.cs located in PassiveTagService\PassiveLib\NFC\, the Read( ) method is where the reading of NFC tags happens. It reads blocks of memory and looks for an NDEF text message and returns the text. Then, in NFCReaderManager.cs located in PassiveTagService\PassiveLib\Mgmt\, the PRTOnNFC-TagRead( ) event method gets invoked; this calls Process-TagReadData( ) which turns it into an NFCTagReadMsg that contains the ID as a HexString, the text, and the reader object. This gets passed on to the NFCTagUpdateProcess which turns it into an NFCTagUpdateMessage which get handled by any outgoing message handler that is defined (write to DB, HTTP Post or TextToWindow).

Figure 5:
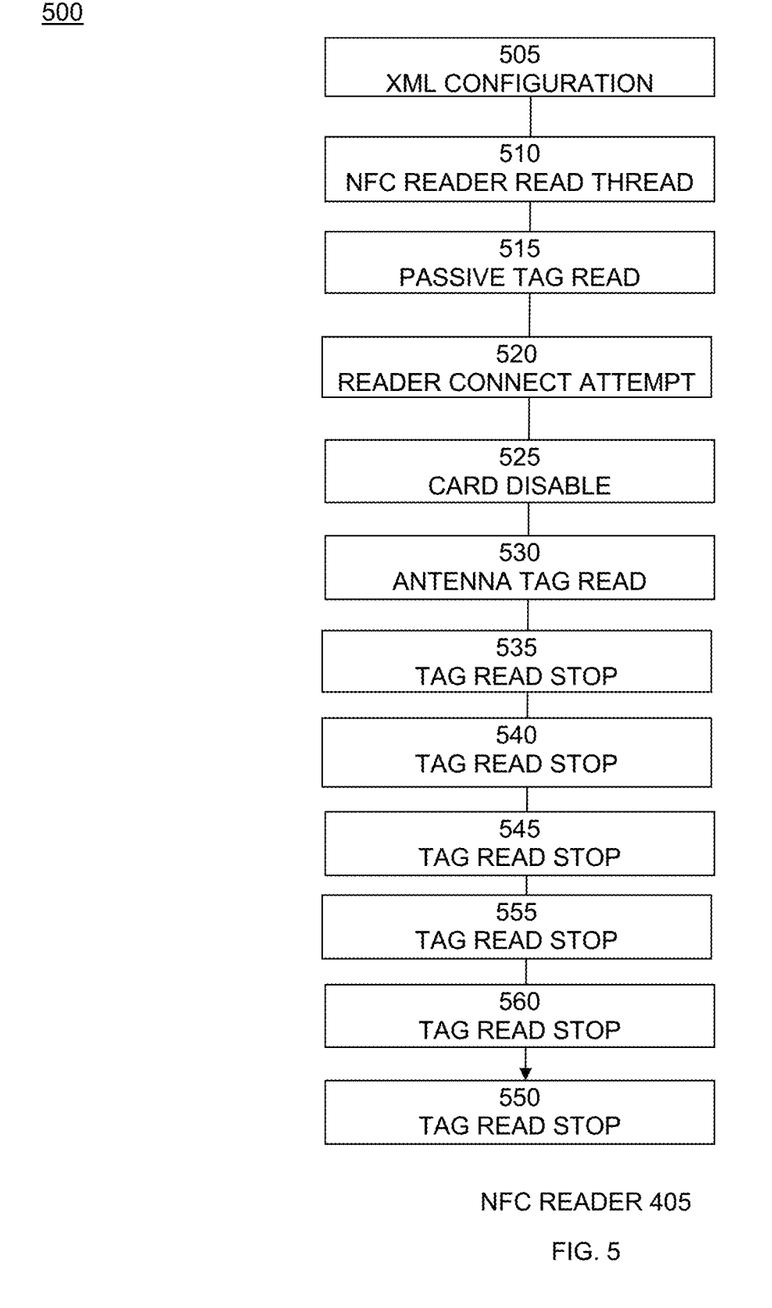
FIG. 5 is a simplified flow chart for an NFC Reader module of a method for the integration of disparate systems through the use of multi-UID RFiD operation in accordance with one embodiment.

FIG. 5 is a simplified flow chart for an NFC Reader 405 module 500 of a method for the integration of disparate systems through the use of multi-UID RFiD operation. Steps comprise: executing XML Configuration 505; executing NFC Reader Read Thread 510; executing a Passive Tag Read 515; executing a Reader Connect Attempt 520; executing a Card Disable 525; executing an Antenna Tag Read 530; executing a Tag Read Stop 535; executing a Reader Disconnect 540; executing a Compare 545; executing an XML Configuration Information Read 550; converting ASCII To HEX 555; and obtaining Passive Antenna Coordinate And Sector Info 560. An embodiment of the module is included in the appendix.

Figure 6:
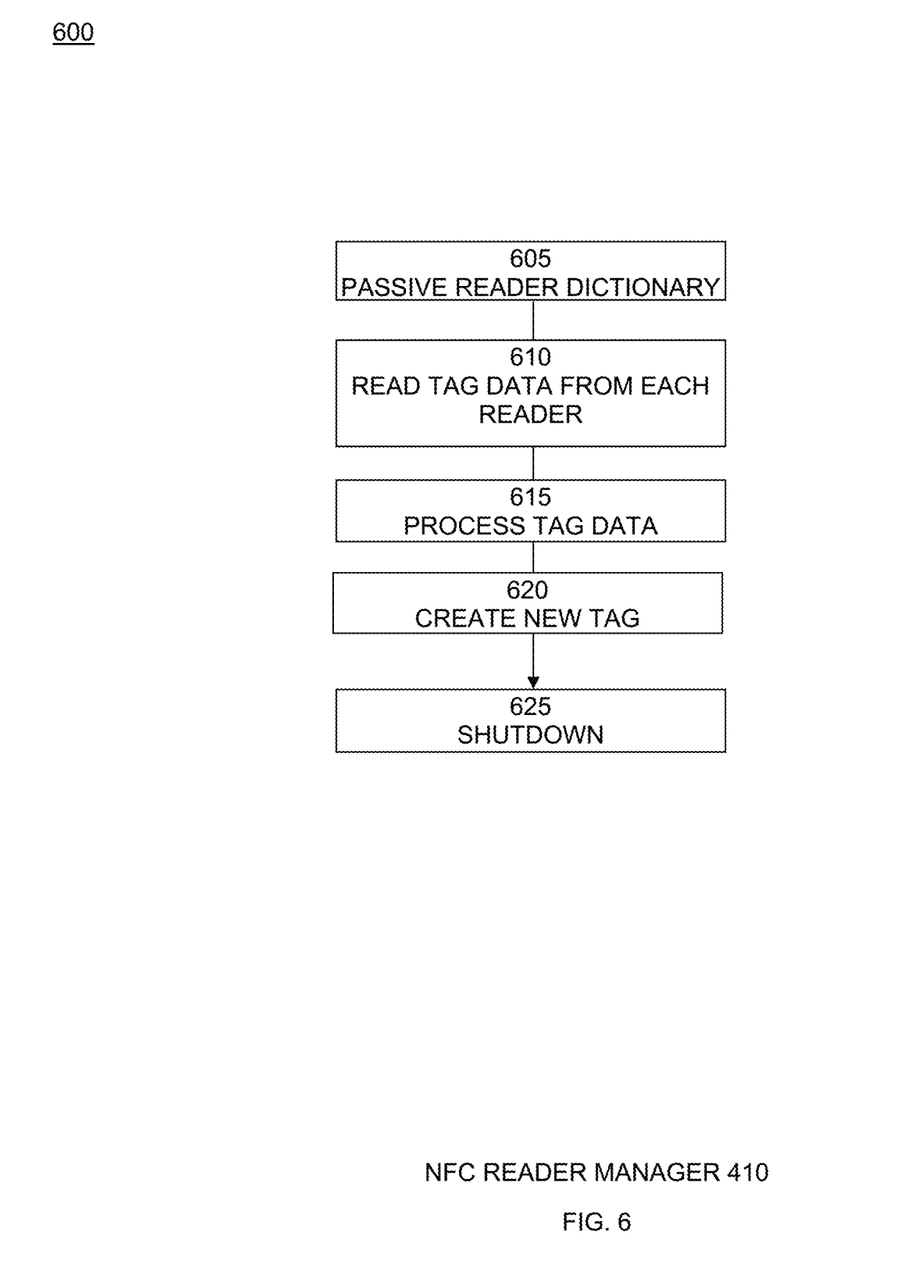
FIG. 6 is a simplified flow chart for an NFC Reader Manager module of a method for the integration of disparate systems through the use of multi-UID RFiD operation in accordance with one embodiment.

FIG. 6 is a simplified flow chart for an NFC Reader Manager 410 module 600 of a method for the integration of disparate systems through the use of multi-UID RFiD operation. Steps comprise: invoking a Passive Reader Dictionary 605; Reading Tag Data from Each Reader 610; Processing Tag Data 615; Creating a New Tag 620; and executing Shut down 625. An embodiment of the module is included in the appendix.

Figure 7:
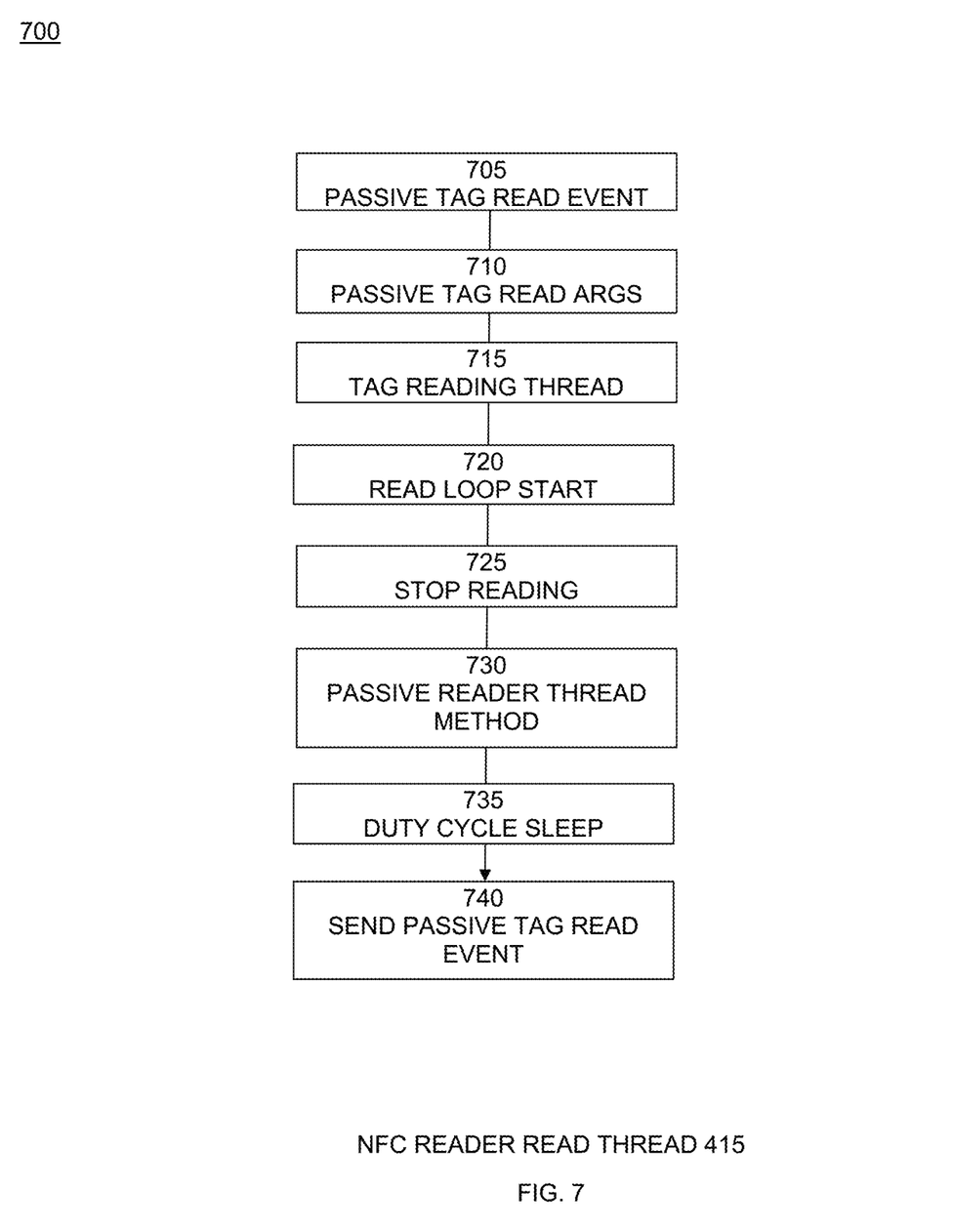
FIG. 7 is a simplified flow chart for an NFC Reader Read Thread module of a method for the integration of disparate systems through the use of multi-UID RFiD operation in accordance with one embodiment.

FIG. 7 is a simplified flow chart for an NFC Reader Read Thread 415 module 700 of a method for the integration of disparate systems through the use of multi-UID RFiD operation. Steps comprise: executing a Passive Tag Read Event 705; Reading Passive Tag ARGS 710; executing a Tag Reading Thread 715; executing a Read Loop Start 720; Stopping Reading 725; executing a Passive Reader Thread Method 730; executing a Duty Cycle Sleep 735; and Sending a Passive Tag Read Event 740. An embodiment of the module is included in the appendix.

Figure 8:
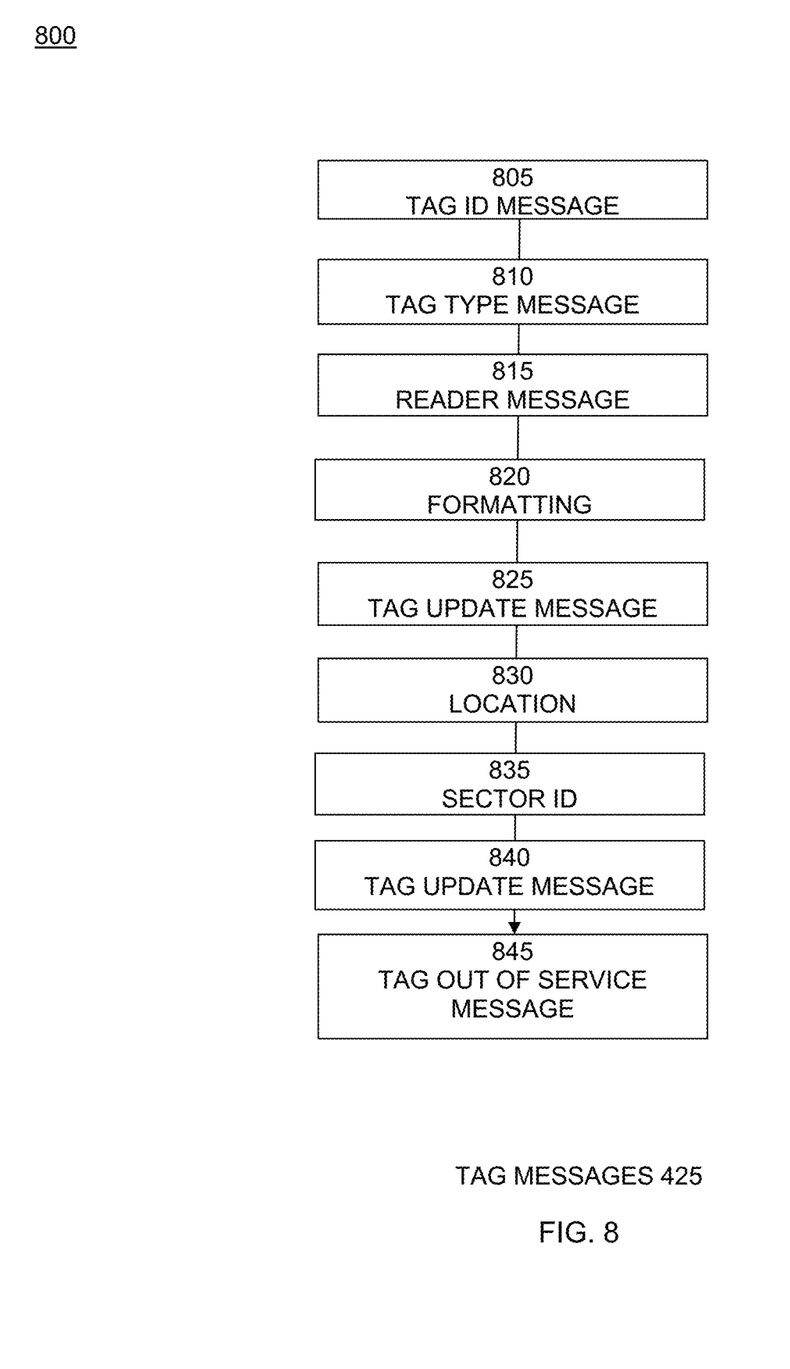
FIG. 8 is a simplified flow chart for a Tag Messages module of a method for the integration of disparate systems through the use of multi-UID RFiD operation in accordance with one embodiment.

FIG. 8 is a simplified flow chart for a Tag Messages 425 module 800 of a method for the integration of disparate systems through the use of multi-UID RFiD operation. Steps comprise: processing Tag Id Message 805; processing Tag Type Message 810; processing Reader Message 815; Formatting 820; processing Tag Update Message 825; executing Location 830; processing Sector Id 835; processing Tag Update Message 840; and processing Tag Out Of Service Message 845. An embodiment of the module is included in the appendix.

Figure 9:
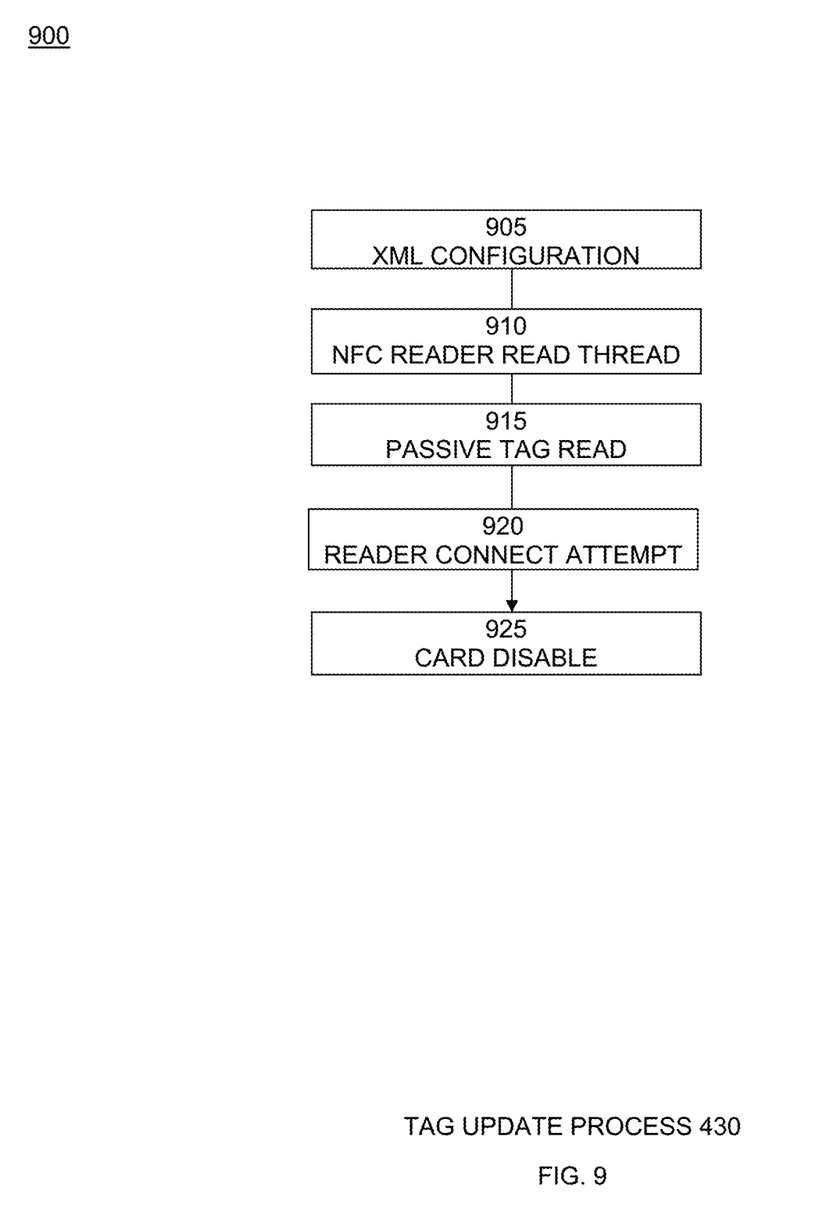
FIG. 9 is a simplified flow chart for a Tag Update Process module of a method for the integration of disparate systems through the use of multi-UID RFiD operation in accordance with one embodiment.

FIG. 9 is a simplified flow chart for a Tag Update Process 430 module 900 of a method for the integration of disparate systems through the use of multi-UID RFiD operation. Steps comprise: executing NFC Reader Manager 905; Adding Message to Queue 910; Starting Process 915; Running 920; and executing Shutdown 925. An embodiment of the module is included in the appendix.

The computing system used for the integration of disparate systems through the use of multi-UID RFiD encoding for performing (or controlling) the operations or functions described herein with respect to the system and/or the method may include a processor, FPGA, I/O devices, a memory system, and a network adaptor. The computing system includes a program module (not shown) for performing (or controlling) the operations or functions described hereinabove with respect to the system and/or the method according to exemplary embodiments. For example, the program module may include routines, programs, objects, components, logic, data structures, or the like, for performing particular tasks or implement particular abstract data types. The processor may execute instructions written in the program module to perform (or control) the operations or functions described hereinabove with respect to the system and/or the method. The program module may be programmed into the integrated circuits of the processor. In an exemplary embodiment, the program module may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using a network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A method for integration of a plurality of disparate systems for communication with at least one tag through a use of multi-UID RFiD encoding comprising:
   providing at least one said RFiD tag device (205) associated with one of an item, a person, or a place;
   said tag communicating with said plurality of disparate systems, said plurality of disparate systems comprising at least a first system (220) and a second system (235), wherein said first system (220) and said second system (235) are unrelated facilities having different control systems;
   said communication comprising executing a plurality of computing modules;
   wherein only an identifier mapping/translation is added to said RFiD tag device, and
   wherein each of said disparate systems stores its unique identifier without requiring knowledge of any other disparate system's requirements, while simultaneously allowing each said disparate system to communicate with other disparate systems by utilizing each other disparate systems' unique identifier.

2. The method of claim 1, wherein said computing modules are:
   an NFC Reader Module (405);
   an NFC Reader Manager Module (410);
   an NFC Reader Read Thread Module (415);
   a Tag Message Module (425); and
   a Tag Update Process Module (430).

3. The method of claim 2, wherein said NFC Reader Module (405) executes, in order, the following steps:
   executing XML Configuration (505);
   executing NFC Reader Read Thread (510);
   executing a Passive Tag Read (515);
   executing a Reader Connect Attempt (520);

executing a Card Disable (525);
executing an Antenna Tag Read (530);
executing a Tag Read Stop (535); executing a Reader Disconnect (540);
executing a Compare (545);
executing an XML Configuration Information Read (550);
converting ASCII To HEX (555); and
obtaining Passive Antenna Coordinate And Sector Info (560).

4. The method of claim 2, wherein said NFC Reader Manager Module (410) executes, in order, the following steps:
   invoking a Passive Reader Dictionary (605);
   Reading Tag Data from Each Reader (610);
   Processing Tag Data (615);
   Creating a New Tag (620); and
   executing Shut down (625).

5. The method of claim 2, wherein said NFC Reader Read Thread Module (415) executes, in order, the following steps:
   executing a Passive Tag Read Event (705);
   reading Passive Tag ARGS (710);
   executing a Tag Reading Thread (715);
   executing a Read Loop Start (720);
   stopping Reading (725);
   executing a Passive Reader Thread Method (730);
   executing a Duty Cycle Sleep (735); and
   sending a Passive Tag Read Event (740).

6. The method of claim 2, wherein said Tag Message Module (425) executes, in order, the following steps:
   processing Tag Id Message (805);
   processing Tag Type Message (810);
   processing Reader Message (815);
   formatting (820);
   processing Tag Update Message (825);
   executing Location (830);
   processing Sector Id (835);
   processing Tag Update Message (840); and
   processing Tag Out Of Service Message (845).

7. The method of claim 2, wherein said Tag Update Process Module (430) executes, in order, the following steps:
   executing NFC Reader Manager (905);
   adding Message to Queue (910);
   starting Process (915);
   running (920); and
   executing Shutdown (925).

8. The method of claim 1, wherein said plurality of systems comprises each of:
   a fitness club (110);
   a spa facility (115);
   a valet parking system (120); and
   a golf course facility (125).

9. The method of claim 1, wherein reading of said tag comprises:
   reading blocks of memory;
   locating an NDEF text message; and
   returning text of said NDEF text message;
   invoking, in said NFC Reader Manager Module, a PRT On NFC Tag Read event method which calls Process Tag Read Data, which turns said text into an NFC Tag Read Msg containing an ID as a HexString, text, and a reader object.

10. The method of claim 1, comprising:
   an NFC Tag Read Msg containing an ID as a HexString, text, and a reader object, wherein said NFC Tag Read Msg is passed on to an NFC Tag Update Process which turns converts said NFC Tag Read Msg into an NFC Tag Update Message which is handled by an outgoing message handler.

11. The method of claim 1, comprising:
   an NFC Tag Read Msg containing an ID as a HexString, text, and a reader object, wherein said NFC Tag Read Msg is passed on to an NFC Tag Update Process which turns converts said NFC Tag Read Msg into an NFC Tag Update Message which is handled by an outgoing message handler, wherein said outgoing message handler is defined for a write to at least one of:
   a DB;
   an HTTP Post; or
   a TextToWindow.

12. The method of claim 1, wherein said communication comprises Near Field Communication (NFC).

13. The method of claim 1, wherein said encoding comprises an NFC Data Exchange Format (NDEF).

14. The method of claim 1, wherein said encoding comprises an NFC Data Exchange Format (NDEF) containing predefined container types, wherein said data types comprise at least one of a URL, an email address, a phone number, a business card, and plain text.

15. A device for integration of a plurality of disparate systems for communication with at least one tag through a use of multi-UID RFiD encoding comprising:
   an RFiD tag (205) comprising:
      a tag antenna for wireless communications;
      at least one tag processor (210), and
      a tag memory (215);
   said RFiD tag (205) communicating with a plurality of said disparate systems, said disparate systems comprising at least a first system (220) and a second system (235), wherein said first system (220) and said second system (235) are unrelated facilities having different control systems, each said disparate system comprising:
      a system antenna for wireless communications;
      at least one system processor; and
      a system memory;
   wherein only an identifier mapping/translation is added to said RFiD device, and
   wherein each of said disparate systems stores its unique identifier without requiring knowledge of any other disparate system's requirements, while simultaneously allowing each said disparate system to communicate with other disparate systems by utilizing each other disparate systems' unique identifier.

16. The device of claim 15, wherein each of said RFiD tag (205) and each of said disparate systems comprises a Near Field Communication (NFC) module.

17. The device of claim 15, wherein encoding comprises an NFC Data Exchange Format (NDEF).

18. The device of claim 15, wherein said communicating comprises computing modules are:
   an NFC Reader Module (405);
   an NFC Reader Manager Module (410);
   an NFC Reader Read Thread Module (415);
   a Tag Message Module (425); and
   a Tag Update Process Module (430).

19. The device of claim 15, wherein each of said RFiD tag (205) and each of said disparate systems comprises an encryption module comprising public and private keys.

20. A system for integration of a plurality of disparate systems for communication with at least one tag through a use of multi-UID RFiD encoding comprising:

at least one said RFiD tag device (205) associated with one of an item, a person, or a place;

a plurality of disparate systems, said plurality of disparate systems comprising at least a first system (220) and a second system (235), wherein said first system (220) and said second system (235) are unrelated facilities having different control systems;

said tag communicating with said plurality of disparate systems;

said communication comprising executing a plurality of computing modules;

said plurality of computing modules are:
- an NFC Reader Module (405);
- an NFC Reader Manager Module (410);
- an NFC Reader Read Thread Module (415);
- a Tag Message Module (425); and
- a Tag Update Process Module (430);

wherein only an identifier mapping/translation is added to said RFiD device, and wherein each of said disparate systems stores its unique identifier without requiring knowledge of any other disparate system's requirements, while simultaneously allowing each said disparate system to communicate with other disparate systems by utilizing each other disparate systems' unique identifier.

* * * * *